United States Patent [19]

Standley

[11] Patent Number: 4,708,610

[45] Date of Patent: Nov. 24, 1987

[54] APPARATUS FOR MAKING AN ENDLESS POWER TRANSMISSION BELT

[75] Inventor: Paul M. Standley, Springfield, Mo.

[73] Assignee: Dayco Products, Inc., Dayton, Ohio

[21] Appl. No.: 23,951

[22] Filed: Mar. 10, 1987

Related U.S. Application Data

[60] Continuation of Ser. No. 871,022, Jun. 5, 1986, abandoned, which is a continuation of Ser. No. 683,087, Dec. 18, 1984, abandoned, which is a division of Ser. No. 367,520, Apr. 12, 1982, Pat. No. 4,511,521.

[51] Int. Cl.⁴ .............................................. B29C 41/04
[52] U.S. Cl. ........................... 425/28 B; 425/174.8 R; 425/435
[58] Field of Search .............. 425/28 B, 174.8 R, 435, 425/308

[56] References Cited

U.S. PATENT DOCUMENTS

| | | | |
|---|---|---|---|
| 3,197,827 | 8/1965 | Haughton et al. | 425/435 |
| 3,312,763 | 4/1967 | Peccerill et al. | 264/108 |
| 3,418,186 | 12/1968 | Wetzel | 264/24 |
| 3,425,883 | 2/1969 | Smith | 425/28 B |
| 3,657,938 | 4/1972 | Fisher | 474/263 |
| 4,012,962 | 3/1977 | Ballou et al. | 474/264 |
| 4,027,545 | 6/1977 | White, Jr. | 474/263 |
| 4,150,927 | 4/1979 | Steingroever | 425/174.8 R |
| 4,184,822 | 1/1980 | Schwabauer | 425/28 B |
| 4,250,128 | 2/1981 | Meckling | 425/435 |
| 4,284,535 | 8/1981 | Lal et al. | 152/524 |

OTHER PUBLICATIONS

Eastman Organic Chemical Bulletin, vol. 45, No. 2, 1973, Petrie et al.

*Primary Examiner*—Tim Miles
*Attorney, Agent, or Firm*—Joseph V. Tassone

[57] ABSTRACT

An endless power transmission belt construction or the like formed of material that is mainly polymeric material and a method and appartus for forming the same are provided, the belt construction comprising a tension section, a compression section, and a load-carrying section disposed intermediate the tension section and the compression section with at least part of the material of at least one of the sections having been oriented by the force of field line means imposed thereon.

9 Claims, 6 Drawing Figures

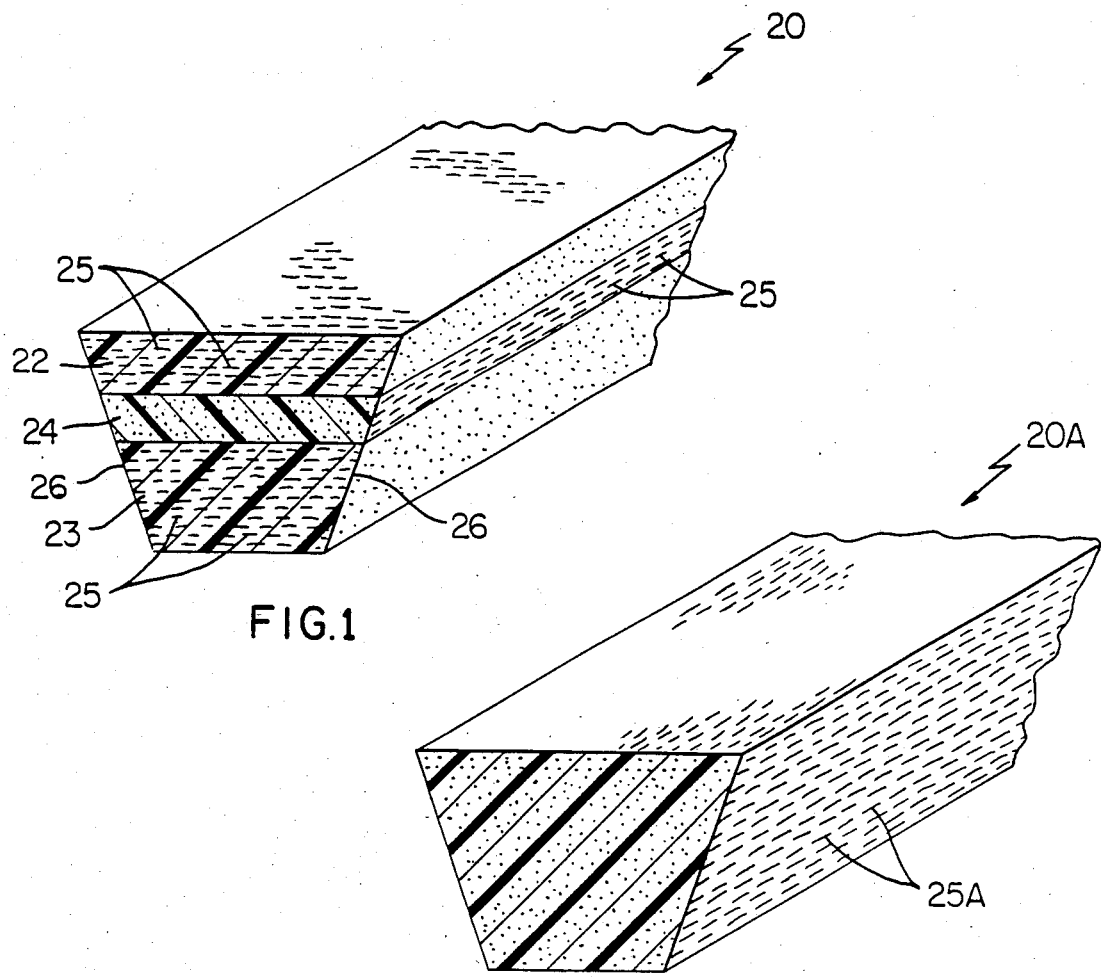
FIG.1
FIG.2
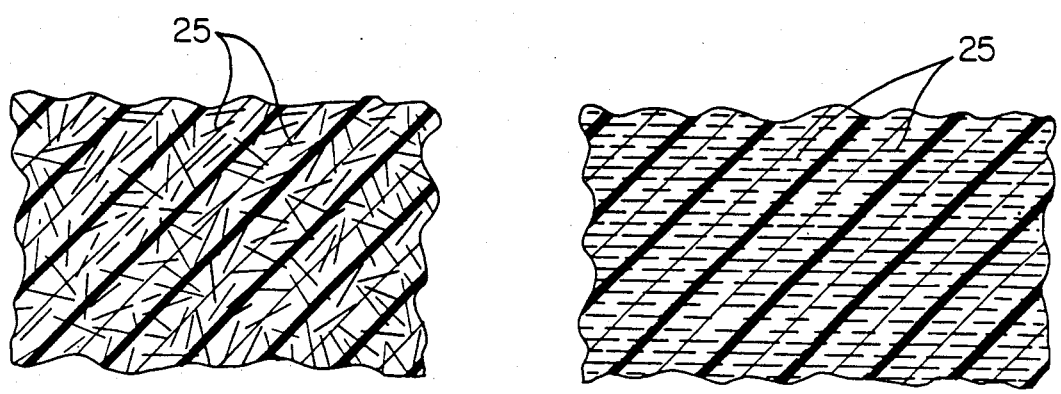
FIG.3
FIG.4

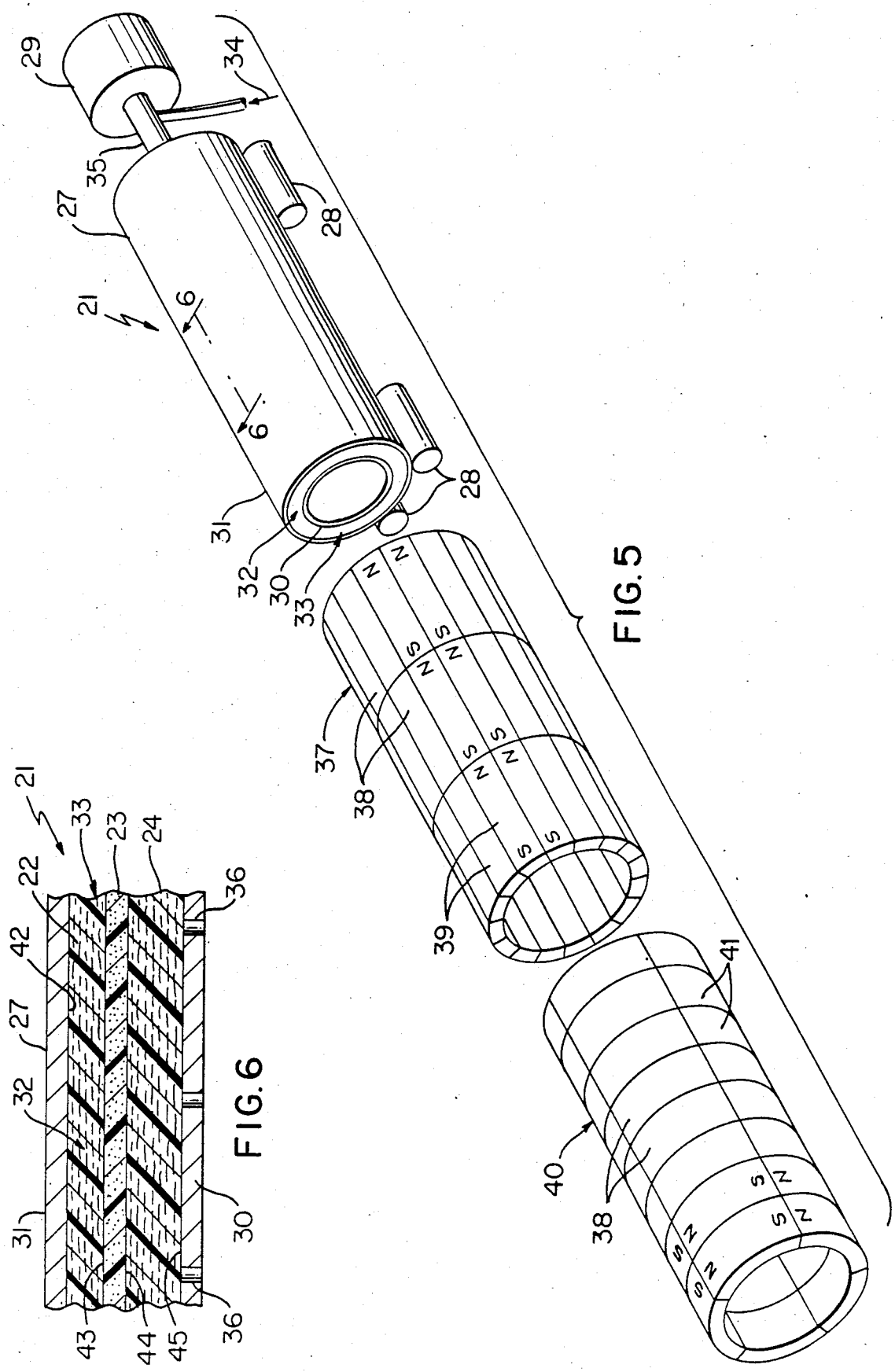

APPARATUS FOR MAKING AN ENDLESS POWER TRANSMISSION BELT

CROSS REFERENCE TO RELATED APPLICATIONS

This application is a continuation patent application of its copending parent patent application, Ser. No. 871,022, filed June 5, 1986, now abandoned, which, in turn, is a continuation patent application of its copending parent patent application, Ser. No. 683,087 filed Dec. 18, 1984, now abandoned, which, in turn is a divisional patent application of its parent patent application, Ser. No. 367,520, filed Apr. 12, 1982, now U.S. Pat. No. 4,511,521.

BACKGROUND OF THE INVENTION

1. Field of the Invention

This invention relates to an improved endless power transmission belt construction or the like as well as to an improved method and apparatus for making the same.

2. Prior Art Statement

It is known in the art to provide an endless power transmission belt construction or the like formed of material that is mainly polymeric material and comprising a tension section, a compression section, and a load-carrying section disposed intermediate the tension section and the compression section with at least part of the material of at least one of the sections being oriented.

For example see the following two U.S. patents:

(1) U.S. Pat. No. 3,657,938—Fisher
(2) U.S. Pat. No. 4,012,962—Ballou et al

It appears that fibers in a polymeric load-carrying section of the endless power transmission belt construction or the like of item (1) above are oriented by an extrusion process so as to be substantially parallel to the longitudinal axis of the belt construction.

It appears that the endless power transmission belt construction of item (2) above has its crystalline structure oriented in a direction that is substantially parallel with the longitudinal axis of the belt construction, the orientation occurring through a stretching of the belt construction.

It is also known to provide a material that is mainly polymeric material and to orient at least part of the material by the force of field line means imposed thereon.

For example, see the following two items:

(3) U.S. Pat. No. 3,312,763—Peccerill et al
(4) Eastman Organic Chemical Bulletin, Volume 45, No. 2, 1973.

It appears from item (3) above that it is known to combine ferrite particles with an unpolymerized plastic material in a liquid state and subsequently apply a magnetic field to orient the particles within the liquid unpolymerized material. Thereafter, and while the magnetic field is continuously applied, heat is then applied to the material to effect a polymerization of the elastomer material and a fixing of the position of the magnet particles within the elastomer material.

It appears from item (4) above that it is known to provide a polymeric material that comprises a liquid crystalline material having a nematic mesophase and to orient the molecular structure thereof by the force of field line means imposed thereon when the material is in a heated mesophase, the field line means being created by magnetic or electric fields.

SUMMARY OF THE INVENTION

It is one feature of this invention to provide an improved endless power transmission belt construction or the like formed of material that is mainly polymeric material and having at least part of that material oriented for reasons well known in the belt construction art.

In particular, it is believed according to the teachings of this invention that the part of the material that is to be oriented can be oriented by imposing the force of field line means thereon, the oriented part of the material either being field line alignable means added to the polymeric material or being a polymeric material itself that can be oriented by the force of field line means, such as a liquid crystalline material that has a nematic mesophase.

In particular, one embodiment of this invention provides an endless power transmission belt construction or the like formed of material that is mainly polymeric material and comprising a tension section, a compression section, and a load-carrying section disposed intermediate the tension section and the compression section with at least part of the material of at least one of the sections having been oriented by the force of field line means imposed thereon.

Accordingly, it is an object of this invention to provide an improved endless power transmission belt construction or the like having one or more of the novel features of this invention as set forth above or hereinafter shown or described.

Another object of this invention is to provide an improved method of making an endless power transmission belt construction or the like, the method of this invention having one or more of the novel features of this invention as set forth above or hereinafter shown or described.

Another object of this invention is to provide an improved apparatus for making an endless power transmission belt construction or the like, the apparatus of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a fragmentary perspective view, partially in cross section, illustrating one embodiment of the endless power transmission belt construction or the like of this invention that it is believed can be made by the method and apparatus of this invention.

FIG. 2 is a view similar to FIG. 1 and illustrates another endless power transmission belt construction or the like of this invention that it is believed can be made by the method and apparatus of this invention.

FIG. 3 is a fragmentary cross-sectional view taken through a material that is mainly polymeric material and illustrating orientable particles thereof disposed in a normal random manner therein.

FIG. 4 is a view similar to FIG. 3 and illustrates the particles after the same have been oriented.

FIG. 5 is an exploded perspective view schematically illustrating the improved apparatus of this invention that is believed to be adapted to form the belt constructions of FIGS. 1 and 2.

FIG. 6 is an enlarged fragmentary cross-sectional view taken on line 6—6 of FIG. 5.

DESCRIPTION OF THE PREFERRED EMBODIMENTS

While the various features of this invention are hereinafter illustrated and described as being particularly adapted to provide an endless power transmission belt construction or the like of the V-belt type, it is to be understood that the various features of this invention can be utilized singly or in various combinations thereof to provide belt constructions of other types.

Also, while various examples are hereinafter given of materials that are believed to be orientable by having the force of field line means imposed thereon in order to produce the improved belt constructions of this invention, it is to be understood that this invention is not to be limited to such examples because it is the intention of this invention to cover other orientable materials than those specifically set forth hereinafter.

Therefore, this invention is not to be limited to only the embodiments illustrated in the drawings, because the drawings are merely utilized to illustrate some of the wide variety of uses of this invention.

Referring now to FIG. 1, an endless power transmission belt construction is generally indicated by the reference numeral 20 and it is believed that the same can be made by the method and apparatus of this invention that is generally indicated by the reference numeral 21 in FIGS. 5 and 6 in a manner hereinafter set forth.

The belt construction 20 comprises a top tension section 22, a bottom compression section 23 and a load-carrying section 24 disposed intermediate the tension section 22 and the compression section 23 in a conventional manner with the sections 22, 23 and 24 each being formed of a material that is mainly polymeric material.

The material of the load-carrying section 24 includes a plurality of orientable particles or means 25 that are illustrated in FIG. 1 as having been oriented to be disposed substantially parallel to the longitudinal axis of the belt construction 20 for the reasons fully set forth in the aforementioned U.S. Pat. Nos. 3,657,938 and 4,012,962 whereby these two patents are being incorporated into this disclosure by this reference thereto.

In contrast, the material of the tension section 22 and the compression section 23 each has orientable particles or means 25 therein with the orientable means 25 in the tension section 22 and compression section 23 being oriented in a direction substantially transverse to the longitudinal axis of the belt construction 20 to provide lateral support to the belt construction 20 between the non-parallel sides 26 thereof for a purpose well known in the art.

In general the material that forms each of the sections 22, 23 and 24 of the belt construction 20 can have the particles 25 dispersed throughout the same in a random manner as illustrated schematically in FIG. 3 and when those particles 25 are oriented, the same generally form an oriented pattern as illustrated in FIG. 4 wherein the particles 25 have aligned themselves with each other so as to tend to extend in the same direction through the material as illustrated in FIGS. 1 and 4.

While the belt construction 20 is illustrated as having three distinct sections 22, 23 and 24 that have been separately formed and bonded together as will be apparent hereinafter, it is to be understood that the various features of this invention can apply to a belt construction wherein the entire belt construction is made from a single homogeneous mass of material as will be apparent hereinafter.

For example, such a belt construction is generally indicated by the reference numeral 20A in FIG. 2 and while the same does not appear to have distinct tension, compression and load-carrying sections, the belt construction 20A nevertheless does have a section or area thereof which will provide the load-carrying function while the part of the belt construction 20A outboard of that load-carrying area will comprise the tension section thereof and the part of the belt construction 20A inboard of the load-carrying section or area thereof will comprise the compression section thereof whereby it can be seen that the features of this invention apply to belt constructions that are formed in separate layers thereof or as one homogeneous mass thereof as is well known in the art.

In any event, it can be seen that the material forming the belt construction 20A has a plurality of orientable particles or means 25A therein which have been oriented in a direction to be substantially parallel to the longitudinal axis of the belt construction 20A throughout the entire belt construction 20A.

However, it is to be understood that the various features of this invention can apply to orienting only part of the orientable material of the belt construction and that oriented part can be in one or more of the sections of the belt construction and can be in different directions or all in the same direction as desired. Further, the orienting direction need not be parallel to the longitudinal axis and/or transverse thereto but can be in other directions as is obvious and as desired.

The method and apparatus 21 of this invention that it is believed can be utilized to produce the belt constructions 20 and 20A comprises a centrifugal mold device 27 adapted to be supported for rotational movement on support roller means 28 and be rotated by a suitable drive means 29 in a manner well known in the art, the mold device 27 including an inner cylindrical sleeve 30, FIG. 6, and an outer cylindrical sleeve 31 defining a cylindrical chamber 32 therebetween in which a belt sleeve that is generally indicated by the reference numeral 33 in FIG. 6 can be formed by a centrifugal casting method as is well known in the art by flowing polymeric material in a liquid or powder form from a suitable source 34, FIG. 5, into a central feed conduit means 35 that is adapted to feed the polymeric material into the chamber 32 through suitable openings 36 in the inner sleeve 30 so that the material will be forced radially outwardly in the chamber 32 by the centrifugal force caused by the device 27 being rotated at a suitable speed in a manner well known in the art. In this manner, the three distinct layers or sections 22, 23 and 24 of the belt sleeve 33 can be separately and serially formed in a manner hereinafter set forth to provide the belt constructions 20 or the belt sleeve 33 can provide the entire material for forming the belt constructions 20A as the case may be as it is to be understood that the belt sleeve 33 is subsequently cut in a suitable manner to provide the individual belt construction 20 or 20A in a manner well known in the art.

In order to orient the orientable means 25 in the material being utilized to form the belt sleeve 33 in a manner hereinafter set forth, it is believed that a cylindrical sleeve means 37 formed from a plurality of electromagnets 38 respectively having their north N and south S poles aligned in rows 39 that are substantially parallel to the longitudinal axis of the sleeve means 37 will tend to orient the means 25 in a direction that is substantially parallel to the longitudinal axis of the mold device 27 when the sleeve means 37 is telescoped over the same and rotating therewith or being stationary and having the mold device 27 rotate therein as desired.

In contrast, another sleeve means 40 of this invention is adapted to be telescoped over the device 27 and it likewise comprises a plurality of electromagnets 38 each having their north N and south S poles disposed in aligned relation but in rows 41 that are circumferentially disposed about the sleeve means 40 so as to tend to orient the means 25 in the material of the device 27 in a circumferential direction about the longitudinal axis of the device 27 as will be apparent hereinafter.

The electromagnets 38 are adapted to impose field force lines in the chamber 32 of the device 27 when the particular sleeve 37 or 40 is disposed over the device 27 so as to tend to cause the means 25 to be oriented in the material containing the same for the reasons fully set forth in the aforementioned U.S. Pat. No. 3,312,763 and the aforementioned publication "Eastman Organic Chemical Bulletin, Volume 45, No. 2, 1973" whereby this patent and this publication are being incorporated into this disclosure by this reference thereto. Of course, the device 27 must be made of suitable material which will not shield or prevent the field line means of the electromagnetic 38 from being imposed in the chamber 32 of the mold device 27. For example, the mold device 27 can be formed of aluminum or formulated silicone rubber and aluminum.

The operation of the apparatus 21 for forming the belt construction 20 of FIG. 1 will now be described.

The sleeve means 37 is disposed over the device 27 and sufficient polymeric material with the orientable means 25 therein is introduced by the feed means 34 into the chamber 32 of the rotating device 27 in a liquid or powder form and because the device 27 is rotating at a certain speed, the material initially being disposed in the chamber 32 is thrown by centrifugal force against the inside surface 42 of the outer sleeve 31 and forms a thickness equal to the layer of tension section 22. While the device 27 is thus rotating, the force of the field line means being imposed on the chamber 32 by the electromagnets 38 of the sleeve means 37 causes the means 25 to align in a direction that is substantially parallel to the longitudinal axis of the sleeve means 37 and device 27 as illustrated in FIG. 6 and while those aligned means 25 are in the condition illustrated in FIG. 6, sufficient heat is supplied to the device 27 in a manner well known in the art to cause at least partial curing of the layer 22 so as to hold the means 25 in their oriented condition as illustrated in FIG. 6.

Thereafter, the sleeve 37 is removed from the device 27 and the sleeve 40 is telescoped onto the device 27. Then the feed means 34 introduces sufficient material into the chamber 32 to form the load-carrying section or layer 24 and because of the centrifugal force created by the rotating device 27, the amount of material being provided for the layer 24 is thrown radially outwardly by centrifugal force against the inside surface 43 of the partially cured tension layer 22 as illustrated in FIG. 6 and the force of the field line means of the electromagnets 38 of the sleeve 40 cause the orientable means 25 therein to orient in a circumferential direction as illustrated in FIG. 6. With the means 25 in the load-carrying or intermediate layer 24 in the oriented condition illustrated in FIG. 6, sufficient heat is supplied to the device 27 to at least partially cure the layer 24 in order to hold the means 25 therein in the oriented condition as illustrated.

The sleeve means 40 is then removed from the device 27 and the sleeve means 37 is retelescoped over the device 27. Then the feed means 34 feeds sufficient material into the chamber 32 of the rotating device 27 to form the compression or inner layer 23 so as to be disposed not only against the inside surface 44 of the partially cured intermediate layer 24, but also to extend all the way inwardly to the outer peripheral surface 45 of the inner sleeve 30. The electromagnets 38 of the sleeve means 37 impose the force of the field line means thereof on the layer 23 to cause the means 25 thereof to orient in a direction substantially parallel to the longitudinal axis of the sleeve means 37 and device 27 and with those means 25 in such oriented condition, not only is the layer 23 now cured by sufficient heat being supplied to the device 27, but also such heat will cause the final curing of the layers 22 and 24 if the same were only partially cured in the manner previously set forth.

Therefore, it can be seen that it is believed that the force of the field line means produced by the electromagnet means 38 in the sleeve means 37 and 40 can be utilized to orient at least part of the material being utilized in the device 27 to form the belt sleeve 33 which will be subsequently utilized to form the belt constructions 20 and 20A through suitable cutting thereof in a manner well known in the belt construction art, the belt construction 20A being made from a belt sleeve 33 wherein only the electromagnet sleeve means 37 is utilized with the device 27.

While the sleeve means 37 and 40 have been previously described as being formed from a plurality of electromagnets 38, it might be found that such sleeves 37 and 40 could be formed from other forms of magnet means or from electric means that will create electric fields that have line means in a manner similar to the field line means of the magnet means for orienting the orientable means 25.

In any event, it can be seen that the method and apparatus 21 previously described is believed to form an endless power transmission belt construction or the like formed of material that is mainly polymeric material and that comprises a tension section, a compression section and a load-carrying section intermediate the tension section and the compression section with at least part of the material of at least one of the sections being oriented by the force of field line means imposed thereon.

As previously set forth, while it is believed that certain orientable materials can be utilized to be oriented by the force of field line means being imposed thereon when forming a belt construction as previously set forth, the following examples are believed to be typical of certain categories of materials that could be utilized in the method and apparatus of this invention for forming an endless power transmission belt construction or the like of this invention and is not to be a limitation on this invention as being the only materials that could be utilized.

In particular, it is believed that the orientable material or means 25 could be iron filings and the polymeric material in which the iron filing 25 would initially be randomly dispersed throughout to form one or all of the sections of an endless power transmission belt construction could be polychloroprene, polyurethane, acrylonitrile butadiene copolymer, polybutadiene, polyisoprene, SBR or blends of these. Such polymeric materials could also have suitable fillers, rust inhibitors, plasticizers and bonding agents disposed therein with the filler being silica or carbon black or both and the rust inhibitor being an amino and/or carbonyl chelator type. Such a composition could be as follows:

Polymer: 100 phr
Filler: 15–50 phr
Iron Filings: 5–100 phr
Rust Inhibitor: 0.5–10 phr
Plasticizer: 0–30 phr
Bonding Agent: 0.5–10.0 phr.

The above composition could also contain a cobalt II complex to facilitate bonding of the elastomeric materials in the formulation to the iron filings, the iron filings to have an aspect ratio greater than 1.5 to 1.0.

Another material that could comprise the orientable material 25 could be a polyferrocene polymer mixed in a liquid or powder thermosetting polymer, the thermosetting polymer being polybutadiene, polyisoprene, polychloroprene, acrylo-nitrile butadiene copolymer or blends of these. The belt composition could also contain iron filings, a rust inhibitor and a bonding agent. For example, such composition could comprise:

Polyferrocene: 10–100 phr
Powder or liquid thermoset polymer: 0–90 phr
Iron filings: 0–50 phr
Rust Inhibitor: 0–5 phr
Bonding agent: 0–10.5 phr.

Another material that can comprise the orientable parts 25 of the polymeric material for a belt construction could comprise a liquid crystalline type of substance of the aromatic acid, amide, ester or ether class which displays a liquid crystalline phase transition (solid to nematic) at a temperature of at least 125° C. This liquid crystalline additive is to possess a nematic phase that can be aligned by the externally applied field force lines whereby by such alignment of this liquid crystal additive, the polymeric material might also align at the same time of incipient cure. Thus, the liquid crystal additive could be mixed in a liquid or powder thermosetting polymer which may be polyisobutylene, polybutadiene, polychloroprene, polyisoprene, acrylonitrile butadiene copolymer, ethylene-propylene copolymer, polyurethane, polypropylene, polyacrylate or blends of these.

It is also believed that the liquid crystalline material need only have a nematic mesophase that is to be of the regular type, displaying uniform one-dimensional molecular or molecular swarm ordering and not the twisted, cholesteric type of helical ordering. The nature of the liquid crystalline material could be any substance which displays one-dimensional ordering after melting from the solid phase and before entering the random isotropic liquid phase.

When such an orientable liquid crystalline substance is added to a castable, thermal setting liquid polymer, it is believed that the application of an electromagnetic field of at least 5,000 gauss in strength will effect alignment of the liquid crystalline material if this force is applied at a temperature at which the liquid crystal additive displays an ordered nematic mesophase. Alignment of this liquid crystal additive must occur before the cross-linking reaction of the thermosetting polymer. The thermosetting polymer should be selected to crosslink in the same temperature range that the liquid crystal additive displays an ordered mesophase, the object of this being to effect polymer orientation by inducing an ordered, orientable state in the liquid crystal additive parallel to the applied field.

The polymers which could be used are polyurethane, polyacrylate (neutral axis), polycarbonate (neutral axis), liquid NBR, CR, BR, phenolic thermosets, epoxy thermosets, polyamides, polyesters and blends thereof.

The field strength of the electromagnets 38 for the apparatus 21 would be dependent upon the speed of rotation of the device 27, viscosity of the compound, concentration of the orientable material in the compound, temperature of the mold/compounds, thickness of the belt sleeve, thickness of the mold, and mold composition. Field strength of some 3,000 to 20,000 gauss have been used to align liquid crystalline substances such as P-azoxyanisole and 4-4' di(benzylideneamino)-biphenyl which have nematic mesophases. The configuration of the electromagnetic segments 38 and wire turns per segment 38 will depend on the field strength necessary to orient the additive material but a tentative strength is believed to be 25,000–50,000 ampere turns per pole.

Other magnetically orientable materials are polyferrocene, carbonyl iron, nickel, cobalt, iron oxide, metal particles of iron, nickel, cobalt and blends of these.

The orientable additive could be an anisotropic needle type of particle of iron, such as filings, etc. Mineral types of magnetically orientable, anisotropic particles that could be used could be magnetic and barium ferrite as well as anistropic nickel, cobalt and carbonyl complexes of iron, nickel, a cobalt or blends of these.

It is believed that one could electrolytically dope the liquid crystalline, polymer preblend to further enhance its ability to orient. Orientation of a nematic liquid crystal mesophase can be electrically induced, such as by utilizing alternative fields of 25,000 oscillations per second which will orient these nematic liquid crystal materials parallel to the direction of the applied field. By doping with an electrolyte (Group 1 halide) the orientation is enhanced.

The liquid crystal additive may have some secondary compounding functions such as cross-linkable, plasticizer or processing aid, anti-oxident, accelerator, etc., these secondary functions being dependent upon the nature of the polymer in which it is mixed.

It is to be understood that the electromagnets may be applied externally and internally simultaneously with the device 27, that the mold may be composed of aluminum or aluminum and formulated silicone rubber and that the internal side of the mold may contain an electromagnet means.

The liquid crystalline additive may be of the Azo- or Azoxy-benzene, acetylene or ester classes of liquid crystalline substances containing from 1 to 3 aromatic rings. The liquid crystal additive is to exhibit a mesophase transition of solid to regular nematic where the nematic mesophase is not to be of the twisted cholesteric type. The alignment of the liquid crystal additive is to be accomplished by external application of an electromagnetic field greater than 5,000 gauss in strength.

Other types of magnetically orientable polymers may be polyvinylferrocene or any magnetic polymer based upon dicyclopenpadienyl iron.

While a centrifugal casting apparatus 21 has been previously set forth, it is to be understood that other types of molding (injection, casting, transfer and press) can be utilized if desired.

And while the previously described liquid crystal additive was to be added to a polymeric material, it is to be understood that substantially the entire polymeric material may be a polymer that possesses a nematic mesophase upon melting which may be oriented via the application of the external magnetic, electric or electromagnetic fields. This could apply to molded (injection, transfer and press) as well as to castable fabrication and belt areas in which this could be utilized could be standard V-belts, synchronous timing belts, CVT, standard toothed belts, fractional horsepower belts, flat belts, etc. These type of polymers offer the advantages of being very high modulus, having a high heat deflection temperature, injection moldable or castable and exist as powders and as such could possibly be pressed or transfer molded.

For example, such a polymeric material for forming a belt construction of this invention could be substantially as follows:

|  |  | Preferred |
| --- | --- | --- |
| Polymer | 100 phr | 100 phr |
| Fiber | 0-30 phr | 10 phr |
| Processing Aid | 0-10 phr | 2 phr |
| Mold Release | 0-2 phr | 0.5 phr |
| Filler | 0-30 phr | 5.0 phr |
| Halide Salt | 0-1 phr | 0.2 phr |
| Resin | 0-20 phr | 0 phr |

The polymer must display a nematic mesophase within a temperature range between solid melting and liquification to an isotropic liquid. Orientation of the polymer occurs while the polymer is in its nematic (one-dimensional ordering) mesophase by the application of a magnetic, electric or electromagnetic field. Where the polymer is any polymer displaying a nematic mesophase upon melting, it may be thermoplastic or thermosetting; the fiber may be synthetic (i.e. polyaramid, graphite, etc.), and may be from 20 microns to $\frac{1}{2}$ inch in length; the filler may be of the reinforcing type (carbon black, silica) or extension type (clay, whiting, etc.). The formulation may include traditional "rubbers" (CR, NBR, XNBR, PBR, SBR, NR, CSM, 11R, and X11R) up to 50% of the orientable polymer loading for viscosity, flex and physical property modification. Accompanying additions of curatives and antidegradants dependent upon the "rubber" additive utilized could be utilized. The resin may be of the thermoplastic, thermosetting, chemical bonding or reinforcing type or blends of these types (i.e. melamine, resorcinolic, phenolic, epoxy, etc.).

The liquid crystalline material previously described could be thermoplastic rather than thermosetting whereby during the casting of the various thermoplastic layers in the apparatus previously described, each inner layer being cast is to be of a thermoplastic material that is cast at a lower temperature than the temperature utilized to cast the preceeding outer layer thereto in order to prevent upsetting the previously oriented condition of the previously cast layer or layers.

Therefore, it can be seen that this invention not only provides an improved endless power transmission belt construction or the like, but also this invention provides an improved method and apparatus for making such a belt construction or the like.

While the forms and methods of this invention now preferred have been illustrated and described as required by the Patent Statute, it is to be understood that other forms and method steps can be utilized and still fall within the scope of the appended claims.

What is claimed is:

1. In an apparatus for making an endless power transmission belt construction or the like formed of material that is mainly polymeric material and that has been cut from an annular belt sleeve and comprises a tension section, a compression section, and a load-carrying section disposed intermediate said tension section and said compression section, said apparatus having means for orienting at least part of the material of at least one of said sections, the improvement wherein said means for orienting said part of said material comprises means for imposing the force of field line means thereon while said material is in liquid form and is in the belt sleeve form thereof.

2. An apparatus for making an endless power transmission belt construction or the like as set forth in claim 1 wherein said means for orienting is adapted to cause said part of said material to be oriented substantially parallel to the longitudinal azis of said belt construction.

3. An apparatus for making an endless power transmission belt construction or the like as set forth in claim 1 wherein said means for orienting is adapted to cause said part of said material to be oriented substantially transverse to the longitudinal axis of said belt construction.

4. An apparatus for making an endless power transmission belt construction or the like as set forth in claim 1 wherein said means for orienting is adapted to cause at least part of the material of two of said sections to be oriented in different directions.

5. An apparatus for making an endless power transmission belt construction or the like as set forth in claim 4 wherein said different directions are adapted to be substantially 90° to each other.

6. An apparatus for making an endless power transmission belt construction or the like as set forth in claim 5 wherein one of said two sections is adapted to be said load-carrying section and have its said direction be substantially parallel to the longitudinal axis of said belt construction.

7. An apparatus for making an endless power transmission belt construction or the like as set forth in claim 1 wherein said orienting means comprises magnet means.

8. An apparatus for making an endless power transmission belt construction or the like as set forth in claim 1 wherein said orienting means comprises electromagnet means.

9. An apparatus for making an endless power transmission belt construction or the like as set forth in claim 1 wherein said orienting means comprises electric field means.

* * * * *

UNITED STATES PATENT AND TRADEMARK OFFICE
CERTIFICATE OF CORRECTION

PATENT NO. : 4,708,610

DATED : November 24, 1987

INVENTOR(S) : Paul M. Srandley

It is certified that error appears in the above-identified patent and that said Letters Patent is hereby corrected as shown below:

The term of this patent subsequent to December 10, 2002, has been disclaimed.

Signed and Sealed this

Sixteenth Day of February, 1988

Attest:

DONALD J. QUIGG

*Attesting Officer*   *Commissioner of Patents and Trademarks*